(12) United States Patent
Hanuschkin et al.

(10) Patent No.: US 12,077,047 B2
(45) Date of Patent: Sep. 3, 2024

(54) CONTROL DEVICE FOR CONTROLLING VEHICLE FUNCTIONS

(71) Applicant: MERCEDES-BENZ GROUP AG, Stuttgart (DE)

(72) Inventors: Alexander Hanuschkin, Weil der Stadt (DE); Florian Etter, Esslingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 181 days.

(21) Appl. No.: 17/923,273

(22) PCT Filed: Apr. 15, 2021

(86) PCT No.: PCT/EP2021/059806
§ 371 (c)(1),
(2) Date: Nov. 4, 2022

(87) PCT Pub. No.: WO2021/223973
PCT Pub. Date: Nov. 11, 2021

(65) Prior Publication Data
US 2023/0234446 A1     Jul. 27, 2023

(30) Foreign Application Priority Data

May 7, 2020   (DE) .................. 10 2020 002 741.5

(51) Int. Cl.
*H01H 47/00*       (2006.01)
*B60K 35/10*       (2024.01)
(Continued)

(52) U.S. Cl.
CPC ............... *B60K 35/10* (2024.01); *G05G 5/02* (2013.01); *G05G 5/05* (2013.01); *G05G 9/047* (2013.01);
(Continued)

(58) Field of Classification Search
None
See application file for complete search history.

(56) References Cited

U.S. PATENT DOCUMENTS 5,726,886 A  *  3/1998  Yamakado ............... G01P 15/18
                                                       701/93
8,072,418 B2 * 12/2011  Crawford ............... H02K 49/10
                                                       345/184
(Continued)

FOREIGN PATENT DOCUMENTS

DE   102011088511 A1   6/2013
EP      0938035 A2    8/1999
(Continued)

OTHER PUBLICATIONS

International Search Report and Written Opinion mailed Sep. 1, 2021 in related/corresponding International Application No. PCT/EP2021/059806.

(Continued)

*Primary Examiner* — Stephen W Jackson
(74) *Attorney, Agent, or Firm* — PATENT PORTFOLIO BUILDERS PLLC

(57) ABSTRACT

A control device controls vehicle functions and has a largely fixed moveable object that can be actively operated by a person for the purpose of control. The object floats over a controlled magnetic field. A sensor is detects a displacement of the object by a person from its neutral position.

8 Claims, 2 Drawing Sheets

(51) Int. Cl.
  *G05G 5/02* (2006.01)
  *G05G 5/05* (2006.01)
  *G05G 9/047* (2006.01)
  *G06F 3/0346* (2013.01)
  *G06F 3/01* (2006.01)

(52) U.S. Cl.
  CPC ...... *G06F 3/0346* (2013.01); *B60K 2360/133* (2024.01); *G05G 2009/04755* (2013.01); *G05G 2009/04766* (2013.01); *G05G 2505/00* (2013.01); *G06F 3/016* (2013.01)

(56) References Cited

U.S. PATENT DOCUMENTS

| | | |
|---|---|---|
| 8,497,767 B2 | 7/2013 | Hollis, Jr. |
| 10,061,400 B2 | 8/2018 | Cheng et al. |
| 2005/0067520 A1* | 3/2005 | Webber .................. B60R 22/40 242/384.4 |
| 2016/0018843 A1 | 1/2016 | Lopez |
| 2017/0322585 A1 | 11/2017 | Tomita et al. |

FOREIGN PATENT DOCUMENTS

| | | |
|---|---|---|
| EP | 3567868 A1 | 11/2019 |
| WO | 2008113542 A1 | 9/2008 |

OTHER PUBLICATIONS

Office Action created Apr. 9, 2021 in related/corresponding DE Application No. 10 2020 002 741.5.

\* cited by examiner

CONTROL DEVICE FOR CONTROLLING VEHICLE FUNCTIONS

BACKGROUND AND SUMMARY OF THE INVENTION

Exemplary embodiments of the invention relate to a control device for controlling vehicle functions, as well as to a method for controlling vehicle functions using a control device of this kind.

Control devices for controlling vehicle functions are known to an extent from the prior art. A panel having touch sensitive surfaces, keys, rotary knobs, and/or the like is very often used as a control device. This is relatively complex for the person operating the vehicle, as they must constantly move their hand to the necessary operating element. It is thus also known from the general prior art to design a control device over a largely fixed but moveable object, which can be actively operated by the person for controlling purposes. An object of this kind can be a joystick, a trackball, or the like, for example. Different embodiments are conceivable here, for example a rotary knob that is mounted such that at least a movement forwards and backwards and to the right and left is possible in addition to a rotation. A selection can also be confirmed by pressing the rotary knob, for example. Via a control device of this kind, a corresponding selection can then be made within menus in a multi-functional display, there is a rudimentary possibility to input texts, to select functions and the like, for example. A control device in the sense of the present invention can however also be a steering wheel, a pedal or the like.

Exemplary embodiments of the present invention are directed to an improved control device for controlling vehicle functions and an improved method for controlling. The control device should in particular enable additional degrees of freedom regarding its operation and an improved operability.

The control device for controlling vehicle functions according to the invention here comprises a largely fixed but moveable object. This object can be actively operated for the purpose of control much like an operating button, a joystick, or the like. According to the invention the object is now designed as an object floating over a controlled magnetic field. A sensor is provided here to detect active operation in the form of a displacement of the object from its neutral position by the person. The control device here uses the technology of so-called levitation to allow an object, which is a sphere according to an advantageous development of the control device according to the invention, having a magnetizable element, e.g., a soft iron core, to float freely in a magnetic field controlled by means of a closed control loop. This object then enables a varied control via a displacement from its neutral position by a person who wants to trigger the vehicle function, as the object can be displaced in all spatial directions and can be rotated around every possible spatial axis in its angle. A very large number of different operations is thus possible, which make an unusually large range of control options that are simple, intuitive, and efficient to operate available to a person using the control device after a short period of practice.

According an advantageous development of the control device, it is provided that the sensor is connected to the control of the magnetic field, specifically in such a way that the magnetic field returns the object to the neutral position in the event of a displacement. This returning of the object to the neutral position enables an output situation that is always the same on the one hand, and on the other allows a force opposing the movement of the object by the person, because the control is constantly trying to return the object to the output position. The force opposing a displacement by a user can here be employed differently depending on its function via a corresponding energization of the electromagnets of the controlled magnetic field. A sensorial or haptic feedback can further be easily and efficiently generated in order to show the person using the control device that the movement has been recognized, and so that the corresponding vehicle function or the desired control command can thus be implemented. To generate pressure points or shifting outputs, it can, for example, be initiated via the magnetic field that the force increases until a given displacement and then decreases again. The sensor of the control device can here be designed in any way. It can be realized by an interior camera, a camera specially directed at the object that can respectively be designed as mono or stereo cameras, for example. Several cameras or different kinds of sensors, for example spacing sensors based on ultrasound or the like, can additionally be used.

It is further additionally provided for the control device according to the invention that data from vehicle sensors is processed which comprises at least acceleration changes of the vehicle, wherein the control of the magnetic field is equipped to hold the object in its neutral position independently of these kinds of acceleration changes of the vehicle. It is thus possible for the levitated object to also be kept in its neutral position in driving maneuvers involving significant accelerations and so that it does not leave its principal position as a result of occurring inertial forces. This serves the comfort of the person using the vehicle and using the control device on the one hand, and on the other hand movements that could falsely be interpreted as control movements can thus be prevented.

As already mentioned, the object can be designed as a sphere according to a very advantageous development of the control device according to the invention. Sensors can here be integrated in the object according to an advantageous development of the invention. Sensors of this kind can in particular be touch-sensitive sensors or surfaces in order to reach even more degrees of freedom when detecting desired control inputs by the person. Acceleration sensors and/or gyroscopes can additionally be provided to detect rotational movements of the object more easily and/or to be able to directly use accelerations acting on the object as a measure for the desired input by the person. The detectable accelerations of the object can here be recognized by the acceleration sensors in the object, in as far as these are used. These can then be directly used as control signals without first needing to be derived from a translational movement in a complex manner.

The object can preferably have a permanent magnet instead of the magnetizable element, or alternatively be magnetized itself. It is here particularly convenient to provide a permanent magnet in the object. According to an unusually convenient development of the control device according to the invention, this permanent magnet can here be gimballed. It is thus possible that the object rotates itself back into the neutral position with respect to at least two, preferably at least three spatial directions, and is thus practically always aligned in the same way, such that in the case of an arrangement to the right of a person driving the vehicle, for example, in the case that the vehicle is equipped with left steering, touch-sensitive sensors are arranged on the right side, which are located in the region of the index finger and middle finger when the object is touched, for example, if the object is laterally encompassed by the person in the manner of a shift lever.

It is further additionally provided for the control device according to the invention that data from vehicle sensors is processed which comprises at least acceleration changes of the vehicle, wherein the control of the magnetic field is equipped to hold the object in its neutral position independently of these kinds of acceleration changes of the vehicle. It is thus possible for the levitated object to also be kept in its neutral position in driving maneuvers involving significant accelerations and so that it does not leave its principal position as a result of occurring inertial forces. This serves the comfort of the person using the vehicle and using the control device on the one hand, and on the other hand movements that could falsely be interpreted as control movements can thus be prevented.

The control device can be used for different vehicle functions. It is particularly suitable for carrying out a sensor-supported interior control or a control in the menu of the multi-function device in a vehicle or the like. A direct control of the vehicle can in principle also be achieved by a control device of this kind, however, for example by directly controlling the steering or the drive train, which is typically described as steer-by-wire or drive-by-wire. The concept according to the invention is ideal for this purpose, as a very simple and efficient control of a plurality of functions is possible via a largely intuitive operation of the levitated object.

A control device of this kind according to the invention allows an entirely neutral interior concept of a vehicle in contrast to conventional control devices, as complex elements, as currently known and largely given regarding their position in the vehicle interior, for example a steering wheel or a pedal, can be dispensed with when one or several of the control devices according to the invention are used. The control device is accordingly still suitable for inputting a driving direction or a driving route requirement in the case of a vehicle driving autonomously without being equipped with a steering wheel or pedals. For example, it can be indicated to the vehicle driving autonomously via a light pressure on the sphere in a direction transverse to the driving direction that the vehicle should turn off at the next crossing in the direction of pressure. The vehicle can correspondingly be made to drive or stop via a pressure in or against the longitudinal direction of the vehicle.

The method for controlling vehicle functions according to the invention using a control device of this kind thus provides that a displacement of the object from the neutral position by a person touching the object is recognized, and the direction, size, and/or the kind of displacement is used in control commands in a vehicle function. As already mentioned, a plurality of different operating possibilities are given here, as accelerations, directions, sizes of the displacement, rotational movements and the like are possible and can be detected, such that a novel but intuitive control and triggering of control commands and vehicle functions becomes possible.

According to an advantageous development of the method, it is here provided that the object is returned to its neutral position in the event of a displacement by means of the control of the magnetic field and an own magnetization or a permanent magnet. A force acting against the displacement is thus achieved. On the one hand, this leads the object to remain largely stationary, and thus that it is always located in the expected position, and can always be operated in the same manner. The return also allows a force to act on the hand of the person operating the object for control purposes, such that the person immediately experiences haptic or sensorial feedback to their inputs, which improves the function safety and raises the confidence of the person in the control device.

Further advantageous embodiments of the control device according to the invention and of the method for controlling vehicle functions using this control device result from the exemplary embodiment which is depicted in more detail in the following with reference to the figures.

BRIEF DESCRIPTION OF THE DRAWING FIGURES

Here:

DETAILED DESCRIPTION

Figure 1:
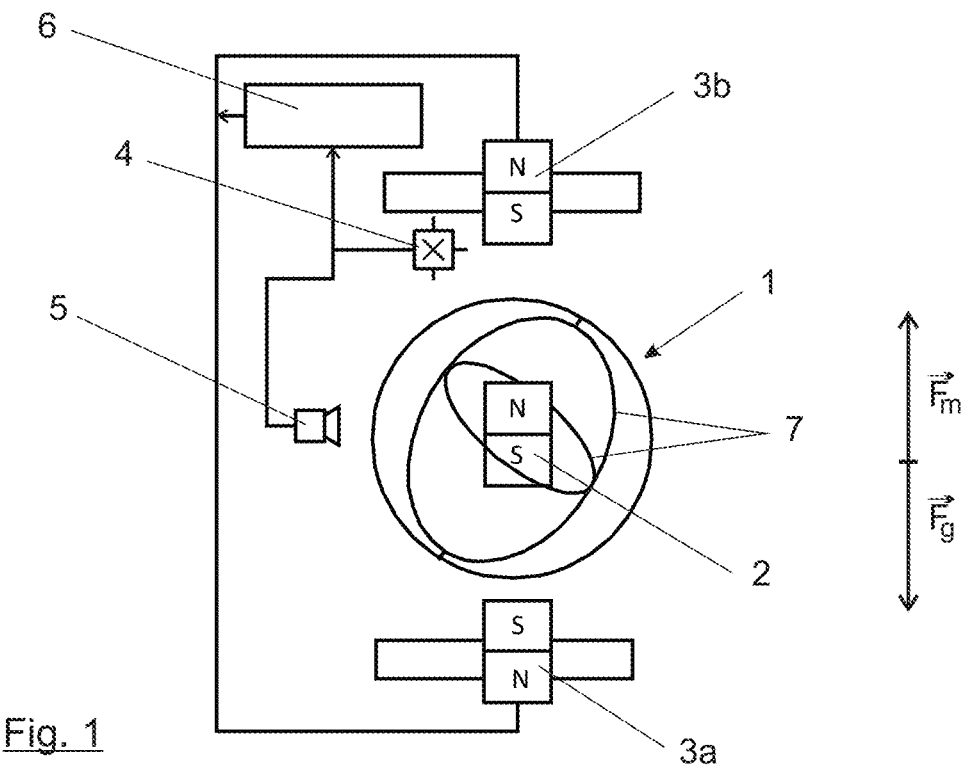
FIG. 1 shows a schematic view of a way of functioning of the control device according to the invention.

Closed control loops allow the so-called levitation of a permanent magnet, or also of ferromagnetic materials in a variably controlled magnetic field. This therefore means that the weight force of the object is balanced by a magnetic force. An object 1 of this kind in the form of a sphere is depicted in the depiction of FIG. 1. A permanent magnet 2 is located in the object 1. In the exemplary embodiment depicted here, an electromagnet 3a, 3b is respectively located above and underneath, for example. The electromagnet 3a underneath the object 1 in the depiction of FIG. 1 is here aligned such that it points towards the permanent magnet 2 in the object 1 with the same pole, such that a repulsion here results. The electromagnet 3b above the object 1 is polarized such that it correspondingly attracts the permanent magnet 2 in the object 1. The magnetic repulsion force and/or attraction force, which is depicted overall as magnetic force $F_m$, thus acts against the weight force $F_g$ of the object 1, and thus makes this object float or levitate. The magnetic forces $F_m$ are here determined by the constant magnetic field strength of the permanent magnet 2, by the spacing between the permanent magnet 2 and the electromagnets 3a, 3b and by the current flow through the electromagnets 3a, 3b, and the variable magnetic field strength of the electromagnets 3a, 3b which is thus generated. Sensors, such as, for example, a Hall sensor 4 for measuring the electrical field strength and a camera 5 and further sensors in some instances, e.g., ultrasound sensors for detecting a spacing or the like, then enable the position of the permanent magnet 2, and thus the position of the object 1, to be determined relative to the electromagnets 3a, 3b, and the current flow through the electromagnets 3a, 3b to be controlled via a control device 6 in such a way that the levitation, and thus the floating of the object 1, is maintained.

The permanent magnet 2 can here preferably be received in the object 1 via a gimbal mounting 7, which is here schematically indicated. It is thus possible not to alter the alignment of the poles (N, S) of the permanent magnet 2 when the object 1 is rotated. The object 1, and thus the sphere having the gimbal-mounted permanent magnet 2 here, can thus be kept in levitation above and/or underneath the object via the controllable electromagnet 3a and/or 3b, wherein the spacing between the electromagnet 3a, 3b and the object 1 can be controlled via the current flow to the electromagnets 3a, 3b, and the weight force $F_g$ is compensated by the magnetic force $F_m$.

Additional electromagnets 3, for example above the object 1, which are not positioned perpendicularly over the object 1, allow tangential forces to compensate on the object 1. Electromagnets of this kind, which are here described in general by 3, are correspondingly indicated in the depiction of FIG. 2. The additional electromagnets 3 in the environment of the object 1, in particular in the event of vehicle movements, such as, for example, accelerations, occurring forces or the like, can thus be compensated via the control device 6 based on these measured vehicle movements and/or on the basis of planned vehicle movements, which are to be expected, for example, because a steering movement is beginning. The floating state of the object 1 is thus reliably maintained and the object 1 reliably remains in its planned position, which can also be described as a neutral position, even in the event of a movement of the vehicle having acting accelerations in the longitudinal or transverse direction.

Figure 2:
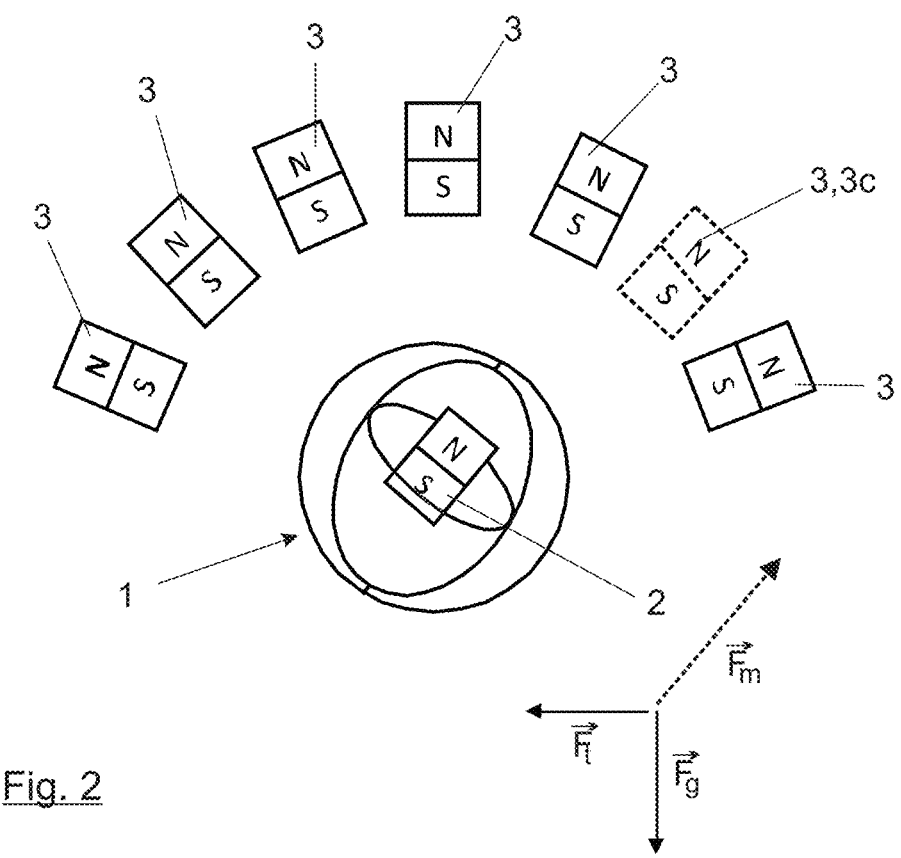
FIG. 2 shows a further view for the depiction of a way of functioning of the control device according to the invention.

In the depiction of FIG. 2, for example, the weight force $F_g$, and, transversely to the latter, a tangential force Ft, is depicted for this purpose in an exemplary manner. The two forces, which are each vectors, must now be correspondingly balanced by the magnetic force $F_m$. This is depicted in a dashed manner in the depiction of FIG. 2 as an opposing force to the vector addition of the tangential force Ft and the weight force $F_g$ of the object 1. This vector addition of the forces then leads to the magnetic force $F_m$ that must be correspondingly balanced, here via the electromagnet 3, which is here denoted by 3c and also marked in a dashed manner like the force arrow.

As already mentioned, the position of the object 1, and here the position of the object 1 in space, and thus its 3D position, is permanently determined and used to control the electromagnet 3 to maintain the levitation. External sensors are here used to determine the 3D position, for example the camera 5 already mentioned, ultrasound sensors (not depicted), or the like. An active measurement can also be carried out. Locatable signals are emitted from the object 1 for this purpose and are externally detected and evaluated. A locatable external position signal can alternatively or additionally be transmitted into the object 1 and evaluated in the object 1.

Figure 3:
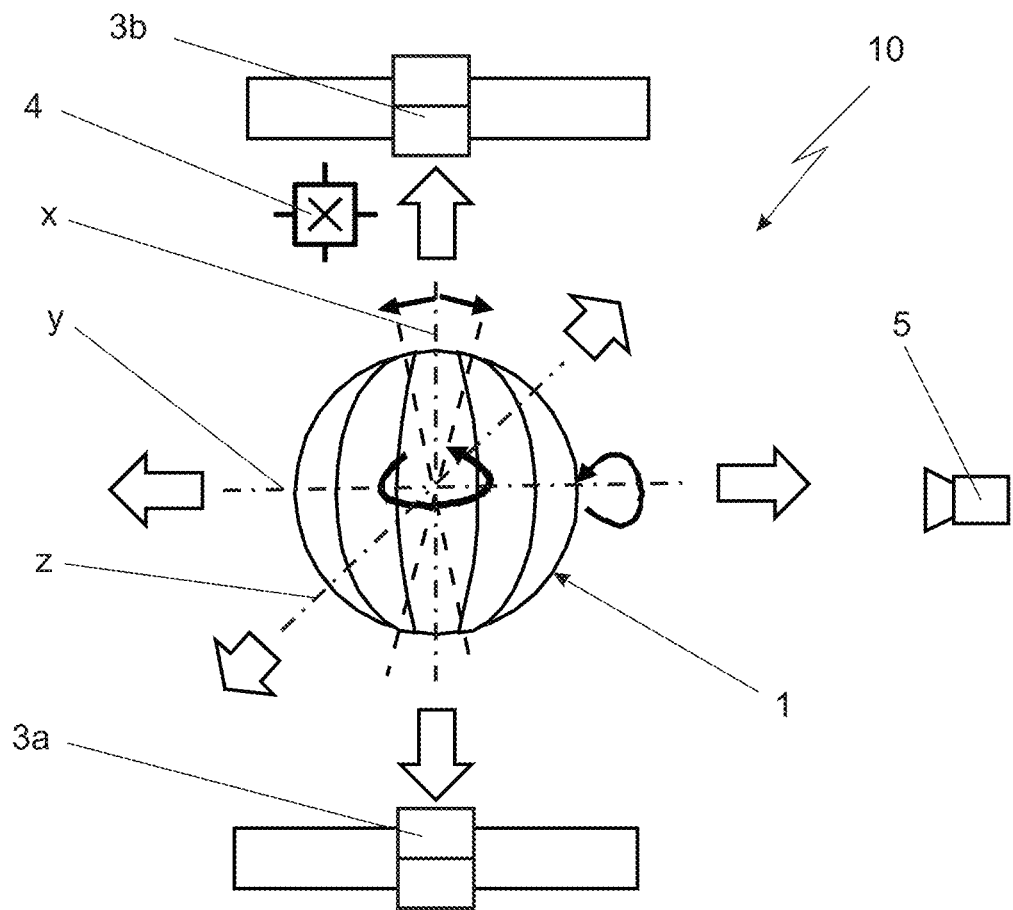
FIG. 3 shows a schematic depiction of the way of functioning and function possibility of the control device according to the invention.

The entire construction now serves as a control device 10, by means of which a person (not depicted here) who uses a vehicle can control vehicle functions. The person touches and moves the object 1 for this purpose. The options which a person has to correspondingly move the object 1 are schematically indicated in the depiction of FIG. 3. The two permanent magnets 3a, 3b and the Hall sensor 4 are depicted again in a purely exemplary form corresponding to the depiction in FIG. 1 in addition to the object 1, which is here a sphere. The camera 5 is located laterally to the right of the object 1 as a further sensor, wherein the construction need not be limited to this kind of sensor. There are now different possibilities for movement. A yaw movement around the vertical axis x running in the perpendicular direction is depicted by the arrow located in the middle of the object 1. This is referred to as a yawing around the vertical axis x. The transverse axis y runs perpendicularly to this vertical axis x in the y direction according to the depiction in FIG. 3. The arrow running around the transverse axis y to the right of the object 1 here indicates a so-called pitch around this transverse axis y. This pitch represents a further kind of rotation around a given axis. A movement around the longitudinal axis running in the z direction can also occur. A roll around the longitudinal axis z is here correspondingly indicated by the arrows and the dashed positions of the vertical axis x rotated around the longitudinal axis z.

Translational movements in all three spatial directions, and thus along the vertical axis x, the transverse axis y, and the longitudinal axis z, are naturally possible, which are also depicted neighboring the respective axes x, y, and z in the object 1 or next to the object 1 by the arrows, in addition to these movements based on the rotation of the object 1. In a translational displacement of the object 1 of this kind, for example in the vertical direction, and thus up or down along the vertical axis x, the closed control loop implements the magnetic field of the electromagnets 3a, 3b such that the sum of the weight force $F_g$ of the object 1 and the force used by the person using the control device 10 to translationally displace the object 1 is now additionally compensated. The person using the control device 10 therefore feels an opposing force when translationally moving the object 1, and thus receives sensorial feedback on the control device via the object 1. In a translational displacement of the object 1 by a person in a horizontal plane, and thus along the transverse axis y and/or the longitudinal axis z, the closed control loop selects an electromagnet 3 positioned in a corresponding angle, and implements its magnetic field such that the sum of the weight force $F_g$ of the object 1 and the force used by the user to translationally displace the object 1 is compensated in turn, such that the person using the control device 10 also feels an opposing force, and thus sensorial feedback in this case. Similarly, this also applies to rotational movements on the object, and thus for yaw, pitch, or roll.

Accelerations of the object can additionally be recognized by means of acceleration sensors in the object 1, wherein these sensors are not depicted here. These too can be directly changed to control signals without the acceleration first having to be complicatedly derived from the translational movement. The object 1 can furthermore contain a gyroscope and/or measurements of the position of the gimbal 7 can be carried out in order to thus provide the corresponding rotational movements around all three axes, and thus the vertical, transverse and/or longitudinal axis. If the object 1 is now rotated by the person using the control device 10, then the electromagnet advantageously maintains the floating state in turn, and correspondingly acts against the position change, such that a control signal is generated on the one hand, and on the other hand sensorial feedback from the object 1 can also be achieved here.

All six degrees of freedom of the floating object 1, and thus all three spatial directions and all three turning angles, and further optional signals, for example acceleration, pressure on the object via pressure sensors, a touch of the object via touch sensors, for example capacitive sensors or the like, can thus be detected. All this can be used to control diverse functions in the vehicle. The control signals from the object are here transferred to the control device 6 depicted in FIG. 1, preferably wirelessly, via sliding contacts and/or a suitable arrangement of wires, and correspondingly processed there. The externally recorded information of the sensor, for example of the Hall sensor 4 and the camera 5, and in some instances further ultrasound sensors and the like (not depicted here) is also processed there and used in the corresponding signals, on the one hand to maintain the levitation of the object 1 in the desired way, and on the other to generate the control signals the person wants via the manipulation of the orientation and position of the floating object 1, and to transfer these to a vehicle control.

Transferring control signals into the vehicle in electronic form, for example steer-by-wire or drive-by-wire, enables innovative control devices 10 of this kind without a physical connection between the control input device and the actuator, such as a steering wheel and the steering, for example. It is thus now possible, via the control device 10 which is explained here and using the control signals transferred to the vehicle control, to drive different functions of the vehicle. This can be the steering already discussed or a control of the drive train. The rotation of the object 1 around the transverse axis y could thus lead to acceleration of the vehicle analogous to acceleration control in the case of a motorbike, whilst the movement around the vertical axis x can be used to control the steering. In general, varied embodiments and combinations of manipulation of the orientation and position of the floating object 1 can be conceived to bundle the vehicle control. A very intuitive operation of the object 1 is therefore possible for many control tasks. In addition to the acceleration and the braking and the steering, further functions can also be simply and efficiently used, such as a manual gear change, the operation of an indicator or the like. This applies in particular for vehicles which drive autonomously, for example on level 5, and which therefore do not need, or for example in the case of level 4, only temporarily need input devices. A levitating sphere of this kind, instead of a conventional rigidly constructed control input device would here be entirely sufficient, and allows a high degree of creative freedom when designing the vehicle interior without unnecessarily restricting the usable space for the people travelling in the vehicle as passengers.

Figure 4:
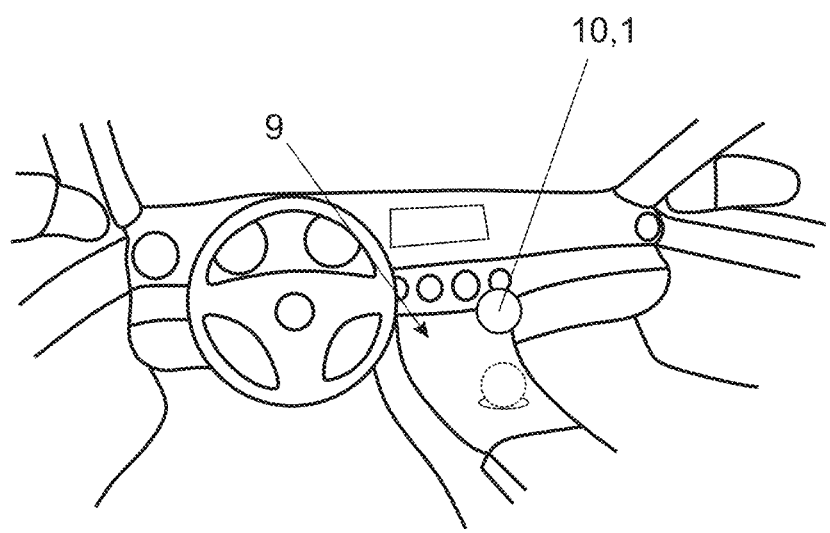
FIG. 4 shows a principle view of a vehicle interior having a possible arrangement of the control device according to the invention.

A further example of using a control device 10 of this kind for inputting vehicle functions is, for example, using the control device for a sensor supported interior control. The control device can then be arranged in the region of a center console 9 of the vehicle, for example, as can be seen in the depiction of FIG. 4, and here enables the control to perform numerous functions instead of a previous joystick and the like. Ambient interior light, an interior scent or the like can thus be controlled using the sphere floating between the front seats in the vehicle in the region of the center console as object 1. A further point can be that the control device 10 having the object 1 can also serve as anti-theft protection. Operating the vehicle without the object 1 can be prevented by means of a coding assigned to the object 1. This object can, however, be transported independently of the vehicle, if it is designed as a smaller sphere, for example, and can thus be carried with a person using the vehicle almost constantly. If another person now tries to use the vehicle, then this is not possible because of the missing object 1.

Finally, it can be noted that in the event of the control device 10 not being used, the object 1 can be lowered out of the region in which it is particularly readily accessible for the purpose of control. It can thus be brought from its position during the active usage of the object 1 in the control device 10, depicted with a solid line, as it is indicated in the depiction of FIG. 4, to the deposit position on the surface of the center console 9 depicted in a dashed position, such as to offer the option to store the object 1 in the interior in a space-saving manner in the event of the object 1 not being needed. When the magnetic field is switched on by activating the electromagnets 3, it can then be brought back to the position or height suitable for the purpose of control as needed, said position or height being individually adjustable by the user according to an advantageous development.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A control device for controlling vehicle functions, the control device comprising:
 a largely fixed moveable object that is actively operated by a person for the controlling of the vehicle functions, wherein the largely fixed moveable object is an object floating over a controlled magnetic field;
 a sensor configured to detect a displacement by the person of the largely fixed moveable object from its neutral position; and
 a controller coupled to the sensor and configured to control the magnetic field in such a way that the magnetic field returns the largely fixed moveable object to the neutral position responsive to the displacement by the person, wherein data from vehicle sensors is processed which comprises at least acceleration changes of the vehicle, wherein the controller is configured to control the magnetic field by holding the largely fixed moveable object in the neutral position independently of the acceleration changes of the vehicle.

2. The control device of claim 1, wherein the largely fixed moveable object is a sphere.

3. The control device of claim 1, wherein the controller is configured to cause a force increase of the largely fixed moveable object until a given displacement and then decrease the force to generate haptic feedback via the magnetic field.

4. The control device of claim 1, wherein the object has integrated sensors.

5. The control device of claim 4, wherein the integrated sensors comprise touch-sensitive sensors or surfaces, acceleration sensors, or gyroscopes.

6. The control device of claim 1, wherein the largely fixed moveable object is magnetized or has a permanent magnet.

7. The control device of claim 6, wherein the permanent magnet is gimbal-mounted in the largely fixed moveable object.

8. A method for controlling vehicle functions using a control device comprising a largely fixed moveable object that controls the vehicle functions and that floats over a controlled magnetic field, the method comprising:
 detecting, by a sensor of the control device, a displacement of the largely fixed moveable object from a neutral position by a person touching the largely fixed moveable object;

determining control commands for a vehicle function based on a direction, magnitude, or kind of the displacement;

returning the largely fixed moveable object to its neutral position responsive to displacement of the largely fixed moveable object;

receiving data from vehicle sensors comprising at least acceleration changes of the vehicle; and holding the largely fixed moveable object in its neutral position independently of the acceleration changes of the vehicle.

* * * * *